United States Patent Office 2,931,401
Patented Apr. 5, 1960

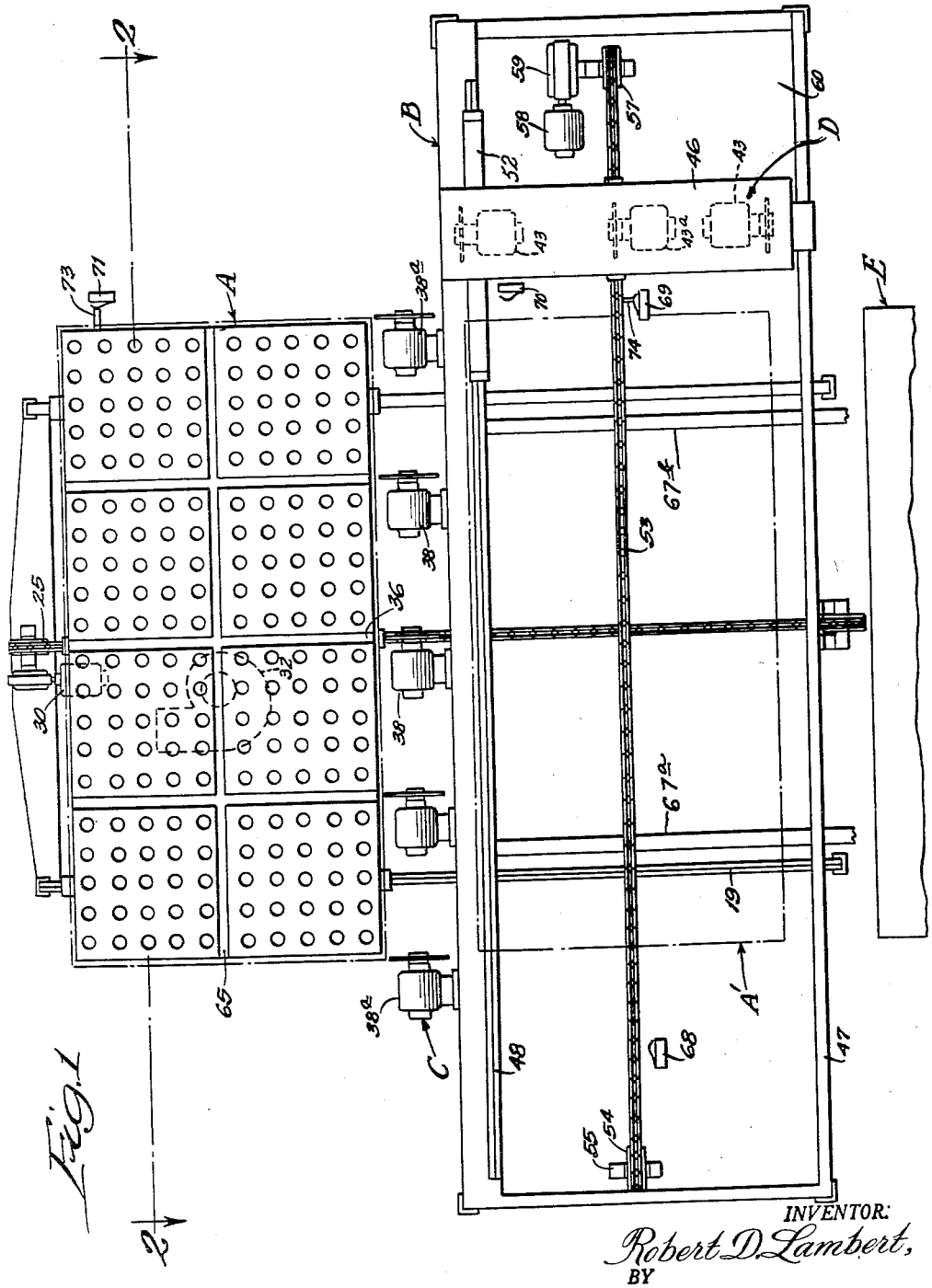

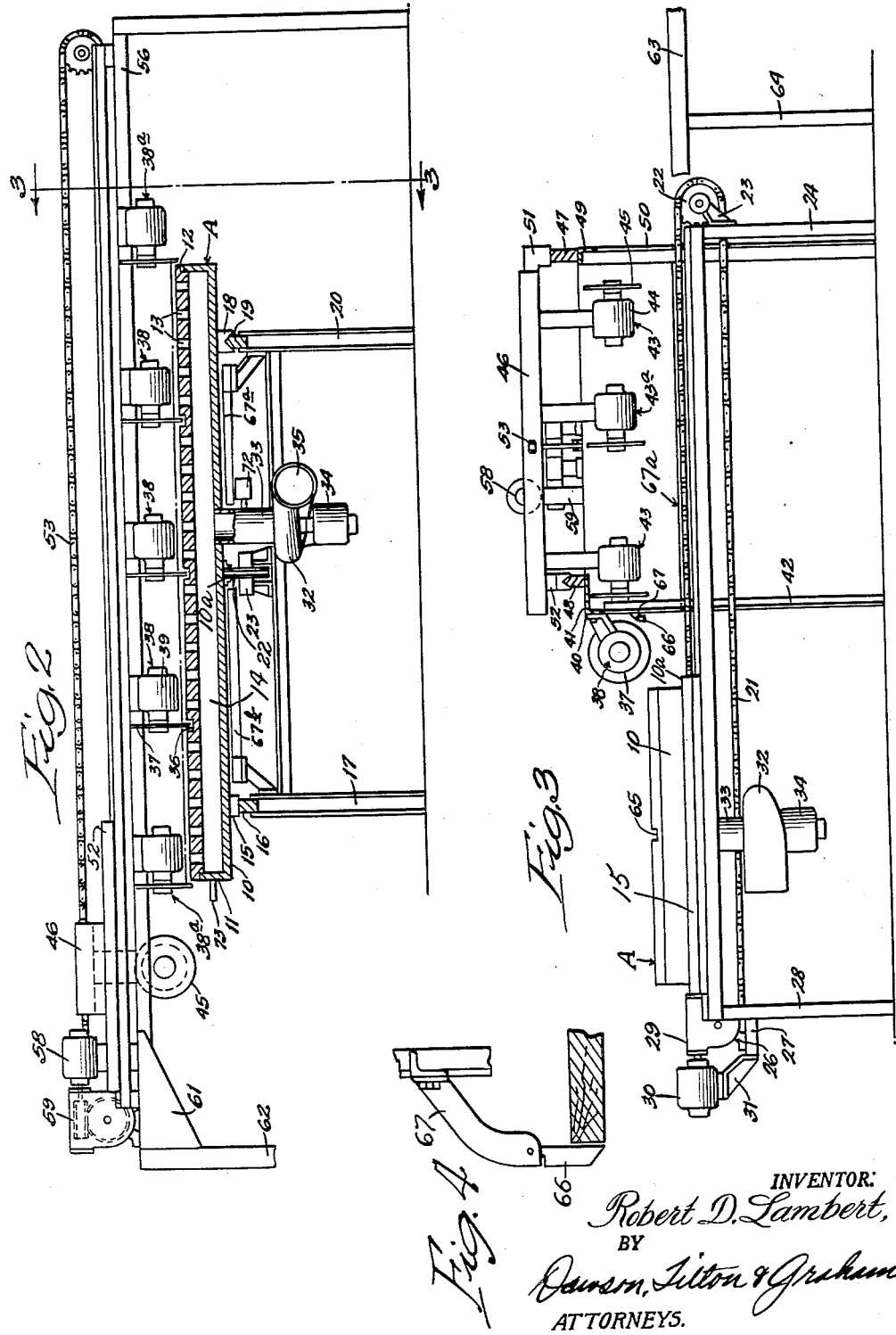

2,931,401

TRIM SAW APPARATUS

Robert D. Lambert, Sandpoint, Idaho, assignor to Changewood Corporation, Chicago, Ill., a corporation of Illinois Application March 12, 1954, Serial No. 415,761

4 Claims. (Cl. 143—48)

This invention relates to saw apparatus and, more particularly, to saw apparatus wherein a relatively large board or similar member is traversed by saw members to trim the board and align the edges thereof, sever the board into lengths having preselected widths, cut the board into a plurality of small pieces, groove the board, or to subject it to other similar operations. The apparatus of this invention is especially useful in trimming the longitudinal and transverse edges of plywood or a pressed board to square the same. As has been indicated, however, the invention is useful in other operations.

In the past, considerable difficulty has been experienced in using a pushing member to engage a pressed and untrimmed board having uneven and soft, compressed edges to bring about the movement of the board along a perfectly straight line between a pair of saws to effect the initial trimming thereof because of the indeterminate position of the soft edge of the board engaged by the face of the pushing member. Also, difficulty has been experienced in securely clamping a board to a platform in order to trim the longitudinal and transverse edges thereof to provide a square board.

It will be appreciated that it is necessary to securely position or hold a board during the trimming thereof for any movement of the board will result in the forming of edges that will not be properly aligned or that are not perfectly straight. While it has, of course, been possible to secure a board to a platform by means of clamp members, the provision of clamps or other obstructions that might interfere with the saws, is undesirable. Further, the securing of the clamps to a board is an operation that requires time and is, therefore, an operation that is relatively expensive. In consequence, it has been the practice to employ a pushing member for engagement with the edge of a board to traverse the board between the saws. A serious problem arises here in that the board tends to rock on the face of the pushing member, especially during the initial trimming operation when the soft, irregular edge of the board is adjacent the pushing member. There has long been a need for a means for rigidly or positively holding a board automatically while it is subjected to sawing operations.

It is accordingly an object of this invention to provide apparatus wherein the disadvantages of prior art structures are overcome. Another object of the invention is to provide means for automatically clamping a board or other object to a platform and for holding the same rigidly thereon while the board is subjected to any of a number of sawing or other woodworking operations. Still another object is to provide a board member having a platform adapted to receive relatively flat boards thereon and to provide means for creating low pressure areas about the platform for clamping a board securely thereto. Still another object is to provide in saw apparatus a platform having a plurality of openings therethrough communicating with a substantially closed chamber below the platform, means being provided to establish a vacuum within the chamber whereby relatively flat boards or other objects received upon the platform will be rigidly clamped thereto by the vacuum.

A further object of the invention is to provide apparatus wherein a board or the like is clamped by vacuum to a movable platform, the platform in its movement being adapted to carry a clamped board thereon into engagement with trim saws, and thereafter holding the board securely upon the platform while additional trim saws engage the board to complete the squaring thereof. Still a further object is to provide in apparatus as described above a stop member that is operative when the movable platform is moved in one direction to eject a board therefrom, while permitting free movement of the platform and a board carried thereby when the platform moves in the opposite direction. Additional objects and advantages will appear as the specification proceeds.

An embodiment of the invention is illustrated in the accompanying drawings, in which—

Figure 1 is a top plan view of apparatus embodying the invention; Fig. 2 is a transverse sectional view taken on the line 2—2 of Fig. 1; Fig. 3 is a longitudinal sectional view taken on the line 3—3 of Fig. 2; and Fig. 4 is an enlarged view of the stop member portion of my invention.

Generally, the apparatus comprises a bed structure A adapted to receive objects thereon, saw apparatus designated generally with the letter B and which comprises longitudinal saw members C and transverse saw members D, and a table or conveyor E which is adapted to receive the boards or other objects after they have been subjected to the sawing operations.

As is seen best in Fig. 2, the bed member A comprises a bottom wall 10 having upwardly-extending side walls 11 that carry at their upper ends a platform 12 equipped with a plurality of openings 13 therethrough. The openings 13 are in communication with a chamber or compartment 14 provided by the bottom wall and side walls of the bed member A. The bottom wall 10 of the bed member is equipped with a pair of runners one of which, number 15, is flat and slidably engages a flat rail 16 carried by the standard 17. The other runner 18 has a V-shaped notch therein that slidably engages a V-shaped rail 19 which is carried by the standard 20. The bed member A is, therefore, movably mounted and is adapted to slide along the rails 16 and 19 in a path provided by the groove in rail 19.

By referring to Fig. 3 it is seen that the bed member A is moved along the rails 16 and 19 by means of a link chain 21 which at one end is connected to the bottom wall 10 of the bed member and at its opposite end is also connected to the bed member on downwardly extending member 10a. The chain 21 is entrained about an idler sprocket 22 which is rotatably mounted upon a bracket 23 secured to an upright 24. The chain 21 is also entrained about a driven sprocket 25 (Fig. 1) which is rotatably mounted upon a bracket 26 which in turn is supported upon a member 27 carried by an upright 28. The sprocket 25 is rotatably driven through a gear reducer 29 which is driven by a motor 30 mounted upon the bracket 31 which in turn is carried by the member 27. The motor 30 is preferably reversible so that the bed member A may be selectively moved forwardly or rearwardly along the rails 16 and 19.

The chamber 14 is partially evacuated so that a vacuum or low pressure area is provided within the openings 13. A vacuum is created within the chamber 14 by any suitable means such as an exhaust fan or pump 32 which communicates with the chamber 14 through a conduit 33.

The fan 32 is driven by a motor 34 and, as is seen in Fig. 2, the fan is provided with a discharge outlet 35.

The platform 12 is provided with a plurality of spaced-apart recesses or channels 36 therein that extend longitudinally of the platform and which are adapted to receive the saw blades 37 of the saw members 38 which also comprise motors 39 which drive the saw blades. As is shown best in Figs. 1 and 2, a plurality of longitudinal saw members 38 are provided. The outer members 38, which for identification are given the numeral 38a, have saw blades that are oriented along but spaced from the longitudinal edges of the platform 12. These saw members are the trim saws which sever the longitudinal edges of a board supported upon the platform. The remaining saws 38 are operative to sever the board into strips. It will be appreciated that any number of saw members 38 may be provided and the exact number will depend solely upon the width of the board being supported upon the platform 12 and the number of strips it is desired to make from the single board.

Each of the saw members 38 and 38a is equipped with a bracket 40 (Figure 3) which is bolted to an L-shaped channel 41 carried upon a standard or vertical support member 42. The saw members are stationary relative to the bed member and platform, and when the bed member is moved by means of the chain 21 the saw blades 37 traverse the platform 12 and are received with in the recesses 36 provided thereby.

The saw apparatus D also provides a plurality of saw members that are designated with the numeral 43. Each of the saw members 43 comprises a motor 44 and saw blade 45 rotatably driven thereby. Each of the saw members is rigidly secured to a carriage 46 which is slidably mounted upon the rails 47 and 48. The rail 47 has a flat surface and is supported upon an L-shaped channel 49 carried by the vertical standard 50. The carriage 46 is equipped with a runner 51 having a flat surface that slidably engages the rail 47 and the carriage is also provided with a runner 52 having an inverted V-shaped recess therein that slidably engages the V-shaped upper surface of the rail 48. To move the carriage 46 from one end of the apparatus to the other, an endless chain 53 is provided that is connected at each end to the carriage 46. The chain 53 is entrained at one end about an idler sprocket 54 which is rotatably mounted upon a bracket 55 secured to the member 56. Adjacent its other end, the chain 53 is entrained about a driven sprocket 57 which is powered by a motor 58 through a gear reducer 59. As is seen best in Fig. 2, the motor 58 and gear reducer 59 are mounted upon a platform 60 (Figure 1) which is supported by an angular bracket 61 upon the end supports 62.

The table or conveyor E may be of any suitable construction and for purposes of simplicity is shown simply as a table having a top or platform 63 supported upon legs 64. It will be appreciated that the member E may be a conveyor that is operative to remove boards after they have been trimmed and ejected from the platform 12.

It will be noted by referring to Figs. 1 and 3, that the platform 12 is equipped with a central transverse channel or recess 65 that is adapted to receive therein the saw blade of the central transverse saw member 43a. The remaining two saw members 43 are provided with saw blades that are spaced outwardly from the forward and rear edges of the platform 12, as is seen best in Fig. 1. It will be noted that in Fig. 1 the position of the bed member A when in the second of its positions is indicated by broken lines, and for purposes of identification the letter A' is attached thereto.

It is desired that the bed member A be free to move under the saw members 38 and into the position shown in broken lines in Fig. 1 when a board is supported upon the platform 12. On the other hand, when the bed member is returned to the starting position it is desired to eject from the platform 12 a board that is supported thereon. This is accomplished by providing a stop member 66 which is pivotally mounted upon an ear 67 carried by the vertical standard 42. The stop member 66 is free to pivot in a counterclockwise direction, as viewed in Fig. 3, but cannot pivot in a clockwise direction beyond the generally vertical position illustrated in Fig. 3. Thus, while the bed member and a board supported thereon may move to the right without interference from the stop member, return movement of the bed member will result in the stop member engaging a board supported upon the platform and holding the same while the platform moves from under the board. The board will be ejected onto the rails 67a and 67b which are at a slightly higher elevation than the rails 16 and 19 and are in substantial alignment with the surface 63 of the table E.

The movement of the platform member A and the movement of the carriage 46 must be in timed relation and the necessary sequential operation is brought about by the microswitches 68, 69, 70, and 71, all seen in Fig. 1, and by a vacuum switch 72 which is seen in Fig. 2. These switches are all conventional and are designed to energize and de-energize associated motors upon being actuated. It is believed unnecessary to describe the structure of these switches in detail since they are conventional, and their operation in relationship to the apparatus described will be brought out subsequently in the description of the operation of the apparatus. If desired, dust collectors may be provided behind the saws to remove sawdust, etc., from the platform A and the grooves 36 and 65 thereof.

Operation

In operation of the apparatus it will be assumed that the bed member A and carriage 46 are in the positions shown in Fig. 1. It will be appreciated that most generally the apparatus will be used in combination with a feed conveyor and perhaps as an integral part of a pressed board processing line. In such case, boards to be trimmed will be fed upon the platform 12 automatically. It will be understood, however, that the platform 12 may be manually fed with boards if this is desired.

Assuming that the motor 34 is operating and is driving the exhaust fan 32, if then a relatively flat object such as a board is placed upon the platform 12 at least a large number of the openings 13 will be covered and preferably the board will be of sufficient size so that all of the openings are covered and the board have edges that extend outwardly from the platform 12. The reduction in pressure within the chamber 14 that will then be created will cause the vacuum switch 72 to close and the motor 30 will then be energized and the bed member A will be carried along the rails 16 and 19, whereby the bed member and platform will be moved under the longitudinal saw members 38 and 38a. During this movement of the bed member, the board carried thereby will have the longitudinal edges trimmed and if the saw members 38 are provided, the board will be severed into four strips.

When the bed member A has moved completely under the saw members 38 and 38a and into the position shown by the broken lines in Fig. 1, the pin 73 carried by the platform will trip the switch 70 which through appropriate circuits, will de-energize the motor 30 and at the same time energize the motor 58. The carriage 46 will then move along the tracks 47 and 48 and the saw members 43 and 43a will trim the transverse edges of the board and will sever the same centrally to provide eight relatively square-shaped pieces of board from the original board that was placed upon the platform 12. During this operation the saw blade of the saw member 43a will be received within the transverse recess 65 provided by the platform 12.

Adjacent the end of the path of travel of the carriage 46, the pin 74 carried by the endless chain 53 will trip the switch 68 and this will de-energize the motor 58 which will stop movement of the carriage 46 and at the same time will energize the motor 30 which will immediately cause the bed member A to move toward its initial position. As it approaches the initial position, the lug or pin 73 will trip the microswitch 71 and the motor 30 will then become de-energized. The operation of the apparatus then ceases until another board is received upon the platform 12 which will produce a low pressure within the chamber 14 and the switch 72 will again be actuated. The sequence of operations will then be repeated, but during this next phase of the cycle the carriage 46 will move from the left to the right, as viewed in Fig. 1, and the pin 74 carried by the chain 53 will engage limit switch 69 to interrupt movement of the carriage 46 and to begin movement of the bed member A.

As has been hereinbefore brought out, when the bed member A moves to the left as seen in Fig. 3, the stop member 66 ejects the severed boards carried thereby and during subsequent return movement of the bed member A the severed boards will be pushed by the bed member A onto the table 63.

During the entire sawing operations, the board prior to being severed and after the severance thereof is securely clamped to the platform 12 by means of the vacuum created within the chamber 14. Because the board is rigidly clamped to the platform, the sawing operations carried on produce true cuts and in a trimming operation the board is accurately squared. A board received upon the platform is secured thereto throughout substantially the entire area of the platform and of the board. There is little likelihood of the board being moved relative to the platform while a vacuum is created within the chamber 14. It will be appreciated that the sawing operations may vary considerably and the bed member may move while the saw members are stationary, the saw members traverse a stationary bed member or, as has been shown, the combination of such structures may be employed. Further, the saw members may be oriented to make diagonal cuts across the platform and the saw members may be arranged to form irregular cuts within a board supported upon the platform member. In any event, the board is rigidly clamped to the platform by the vacuum means.

While in the foregoing specification an embodiment of the invention has been described in considerable detail for purposes of illustration, it will be appreciated that those skilled in the art may vary these details considerably without departing from the spirit and principles of the invention.

I claim:

1. In saw apparatus of the character described, a longitudinally extending bed, a carriage reciprocable longitudinally along said bed and comprising a box having a platform providing the top wall thereof, said platform having a plurality of openings therein communicating with the interior of said box, means for reciprocating said carriage along said bed, air exhausting means communicating with the interior of said box for withdrawing air therefrom to create areas of reduced pressure at the openings of said platform, said platform being adapted to receive boards and like articles thereon whereby such articles are clamped in position by the pressure difference over such areas of reduced pressure, longitudinally cutting saw members positioned across said bed in the path of movement of said carriage for engagement with articles clamped on said platform to cut the same, a second set of saw members arranged with respect to said bed for alignment with said platform in one position of its reciprocable movement, and means for moving the second set of saw members across said platform when aligned therewith for transversely cutting articles clamped thereto.

2. Apparatus of the character set forth in claim 1 wherein said platform is provided with a plurality of longitudinally and transversely positioned recesses thereacross each adapted to receive a portion of a circular saw therein.

3. In trim saw apparatus of the character described, a longitudinally extending bed, a carriage reciprocable longitudinally along said bed and comprising a box having a platform providing the top wall thereof, said platform having a plurality of openings therein communicating with the interior of said box, motor means for reciprocating said carriage along said bed, air exhausting means communicating with the interior of said box for withdrawing air therefrom to create areas of reduced pressure at the openings in said platform, said platform being adapted to receive boards and like articles thereon whereby such articles are clamped in position by the pressure difference over such areas of reduced pressure, longitudinal saw members positioned across said bed in the path of movement of said carriage for engagement with articles clamped on said platform to cut the same, transversely positioned saw members arranged with respect to said bed for alignment with said platform in one position of its reciprocable movement, and means for moving said transverse saw members across said platform when aligned therewith for cutting articles clamped thereto, circuit means and controls associated with said apparatus for operating said apparatus in sequential relation, and circuit means and controls including a pressure-sensitive switch actuated by the development of a reduced pressure within said box when an article is placed thereon for energizing said means for reciprocating said carriage, switch means actuated by the movement of said platform into a predetermined position for deenergizing said means for reciprocating said platform and at the same time for energizing the means for moving the transverse saw members, and switch means actuated by the movement of said transverse saw members into a predetermined position for deenergizing the means for moving them and at the same time for reenergizing the means for reciprocating said carriage to cause it to be returned to its starting position.

4. Apparatus of the character set forth in claim 3 wherein a stop member is provided in the path of movement of said platform for engaging an article positioned thereon during movement of the platform to starting position to eject such article therefrom while affording free movement of the platform and an article thereon in the opposite direction.

References Cited in the file of this patent

UNITED STATES PATENTS

| | | |
|---|---|---|
| 306,186 | Smith | Oct. 7, 1884 |
| 322,134 | Smith | July 14, 1885 |
| 355,557 | Sands | Jan. 4, 1887 |
| 384,786 | Rehfuss | June 19, 1888 |
| 856,767 | Colvin et al. | June 11, 1907 |
| 1,257,738 | Pratt | Feb. 26, 1918 |
| 1,329,634 | Schumacher | Feb. 3, 1920 |
| 1,588,345 | Brown | June 8, 1926 |
| 1,649,991 | Spang | Nov. 22, 1927 |
| 1,767,012 | Pfau | June 24, 1930 |
| 1,815,547 | Byrnes | July 21, 1931 |

FOREIGN PATENTS

| | | |
|---|---|---|
| 222,851 | Switzerland | Nov. 2, 1942 |